US008831941B2

(12) United States Patent
Gilbert et al.

(10) Patent No.: US 8,831,941 B2
(45) Date of Patent: Sep. 9, 2014

(54) SYSTEM AND METHOD FOR TRACKING FRAUDULENT ELECTRONIC TRANSACTIONS USING VOICEPRINTS OF UNCOMMON WORDS

(75) Inventors: Mazin Gilbert, Warren, NJ (US); Jay Wilpon, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1573 days.

(21) Appl. No.: 11/754,800

(22) Filed: May 29, 2007

(65) Prior Publication Data

US 2008/0300877 A1    Dec. 4, 2008

(51) Int. Cl.
| | |
|---|---|
| *G10L 19/00* | (2013.01) |
| *H04M 3/00* | (2006.01) |
| *G10L 17/00* | (2013.01) |
| *G06Q 40/00* | (2012.01) |
| *H04M 3/38* | (2006.01) |
| *G10L 15/02* | (2006.01) |

(52) U.S. Cl.
CPC ............... *G10L 17/005* (2013.01); *H04M 3/38* (2013.01); *G10L 15/02* (2013.01); *G06Q 40/00* (2013.01)
USPC ............................ 704/246; 704/236; 379/189

(58) Field of Classification Search
CPC ......... G10L 17/005; G10L 15/02; H04M 3/38
USPC ............................................ 704/236; 706/20
See application file for complete search history.

(56) References Cited

U.S. PATENT DOCUMENTS

| | | | |
|---|---|---|---|
| 4,653,097 A | | 3/1987 | Watanabe et al. |
| 5,339,385 A | * | 8/1994 | Higgins ........................ 704/246 |
| 5,414,755 A | * | 5/1995 | Bahler et al. ............... 379/88.02 |
| 6,879,968 B1 | * | 4/2005 | Hayakawa et al. ............. 706/20 |
| 2006/0248019 A1 | | 11/2006 | Rajakumar |
| 2007/0071206 A1 | * | 3/2007 | Gainsboro et al. ............ 379/168 |
| 2008/0195387 A1 | * | 8/2008 | Zigel et al. .................... 704/236 |

OTHER PUBLICATIONS

T. Paek and E. Horvitz "Conversation As Action Under Uncertainty", in Proc Conf on Uncertainty in Artificial Intelligence (UAI), Stanford, California, 2000.
Ryuichiro Higashinaka et al. "Corpus-based Discourse Understanding in Spoken Dialogue Systems" in Proc Association for Computational Linguistics (ACL), Sapporo, Japan, 2003.
J. Williams, "Partially Observable Markov Decision Processes for Spoken Dialogue Management," Ph.D. dissertation, Cambridge University, 2006.
Steve Young er al. "The Hidden Information State Approach To Dialog Management," in Proc Intl Conf on Acoustics, Speech, and Signal Processing (ICASSP), Honolulu, Hawaii, USA, 2007.

(Continued)

*Primary Examiner* — Farzad Kazeminezhad

(57) ABSTRACT

Disclosed are systems, methods, and computer readable media for comparing customer voice prints comprising of uncommonly spoken words with a database of known fraudulent voice signatures and continually updating the database to decrease the risk of identity theft. The method embodiment comprises comparing a received voice signal against a database of known fraudulent voice signatures, denying the caller's transaction if the voice signal substantially matches the database of known fraudulent voice signatures, adding the caller's voice signal to the database of known fraudulent voice signatures if the voice signal does not substantially match a separate speaker verification database and received additional information is not verified.

14 Claims, 3 Drawing Sheets

(56) References Cited

OTHER PUBLICATIONS

Michael K. Pitt et al. "Filtering via Simulation: Auxiliary Particle Filters," Journal of the American Statistical Association, vol. 94, No. 446, 1999.

L. P. Kaelbling et al. "Planning and Acting in Partially Observable Stochastic Domains," Artificial Intelligence, vol. 101, 1998.

J. Williams "Applying POMDPs To Dialog Systems In The Troubleshooting Domain," in NAACL-HLT Workshop on Bridging the Gap: Academic and Industrial Research in Dialog Technologies, Rochester, New York, USA, 2007.

Jason D. Williams et al. "Partially Observable Markov Decision Processes with Continuous Observations for Dialogue Management," in Pro SIGdial Workshop on Discourse and Dialogue, Lisbon, 2005.

K. Kanazawa et al. "Stochastic Simulation Algorithms For Dynamic Probabilistic Networks," in Proc Conf on Uncertainty in Artificial Intelligence (UAI), Montreal, Quebec, Canada, 1995.

F. Jensen, "Bayesian Networks And Decision Graphs" Springer Verlag, 2001. (Book).

M. Tanner, "Tools For Statistical Inference" Springer Verlag, 1993. (Book).

* cited by examiner

SYSTEM AND METHOD FOR TRACKING FRAUDULENT ELECTRONIC TRANSACTIONS USING VOICEPRINTS OF UNCOMMON WORDS

BACKGROUND OF THE INVENTION

1. Field of the Invention

The present invention relates generally to transaction fraud detection and more specifically to detecting credit card or other fraud by comparing voice samples to a database of known fraudulent voice signatures.

2. Introduction

Currently, many users complete transactions on the Internet with credit cards. Many other users hesitate to use credit cards on the Internet for fear of identity theft. Identity theft is when an imposter attempts to use another's personal information to complete a transaction, for example trying to purchase a DVD boxed set from Amazon.com using stolen credit card information. Because online transactions are not conducted face to face, many card-based methods, such as printing a photograph of the cardholder on the card itself, have failed to adequately protect from identity theft in the eyes of consumers and the media. Although the risks of identity theft are generally no greater on the Internet than in other settings, the public perception is that the Internet is a risky place for credit card transactions. This public perception slows commerce and prevents companies from generating billions of dollars of new revenue. A small percentage of repeat offenders can encourage the public perception of the Internet as a risky place for commerce. Accordingly, what is needed in the art is a way to improve fraud detection and increase public trust in electronic commerce.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable media for detecting fraudulent transactions using voice data to continually update a database of known fraudulent voice signatures. An exemplary method embodiment comprises comparing a received voice signal against a database of known fraudulent voice signatures, denying the caller's transaction if the voice signal substantially matches the database of known fraudulent voice signatures, and adding the caller's voice signal to the database of known fraudulent voice signatures if the voice signal does not substantially match a separate speaker verification database and received additional information is not verified.

The principles of the invention may be utilized to provide an additional layer of security for credit card transactions through voice recognition. In this way, repeat fraudsters are prevented from committing additional fraud because their voices are identified and added to the database of known fraudulent voice signatures.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
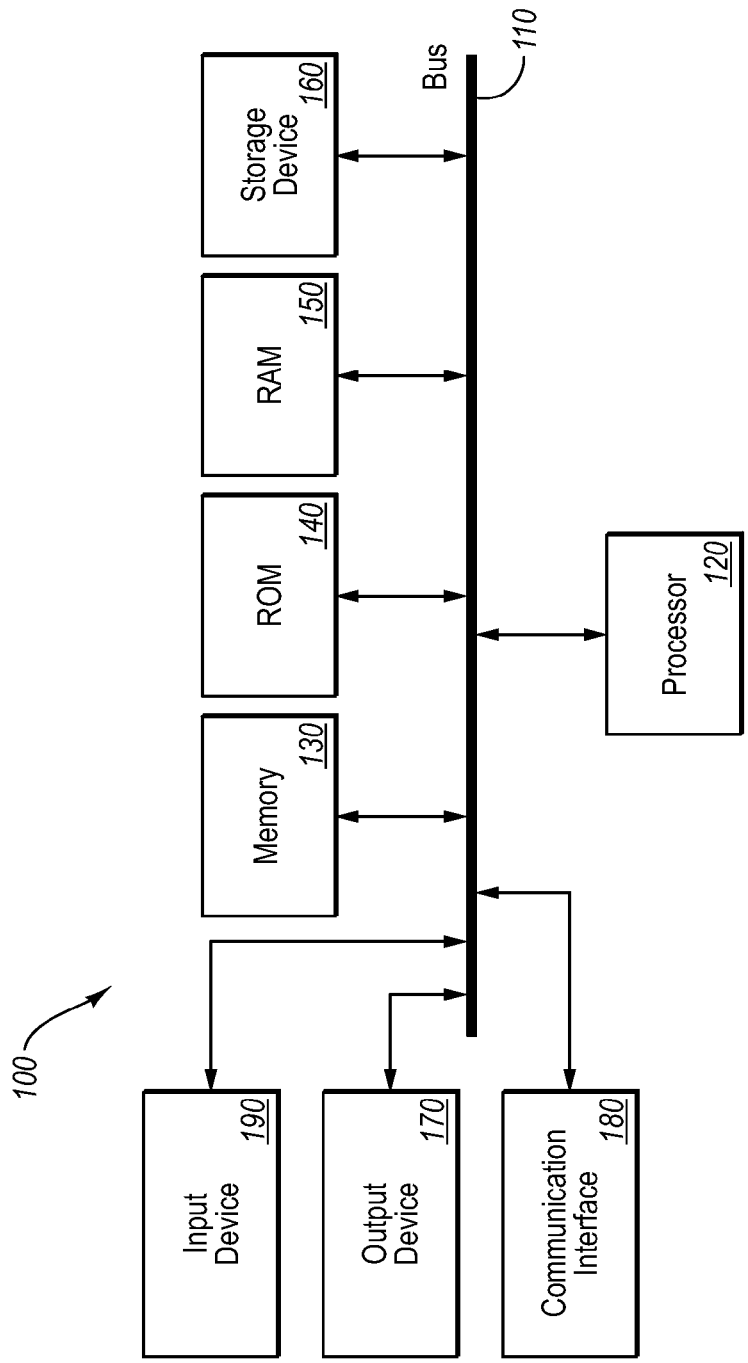
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (RO for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
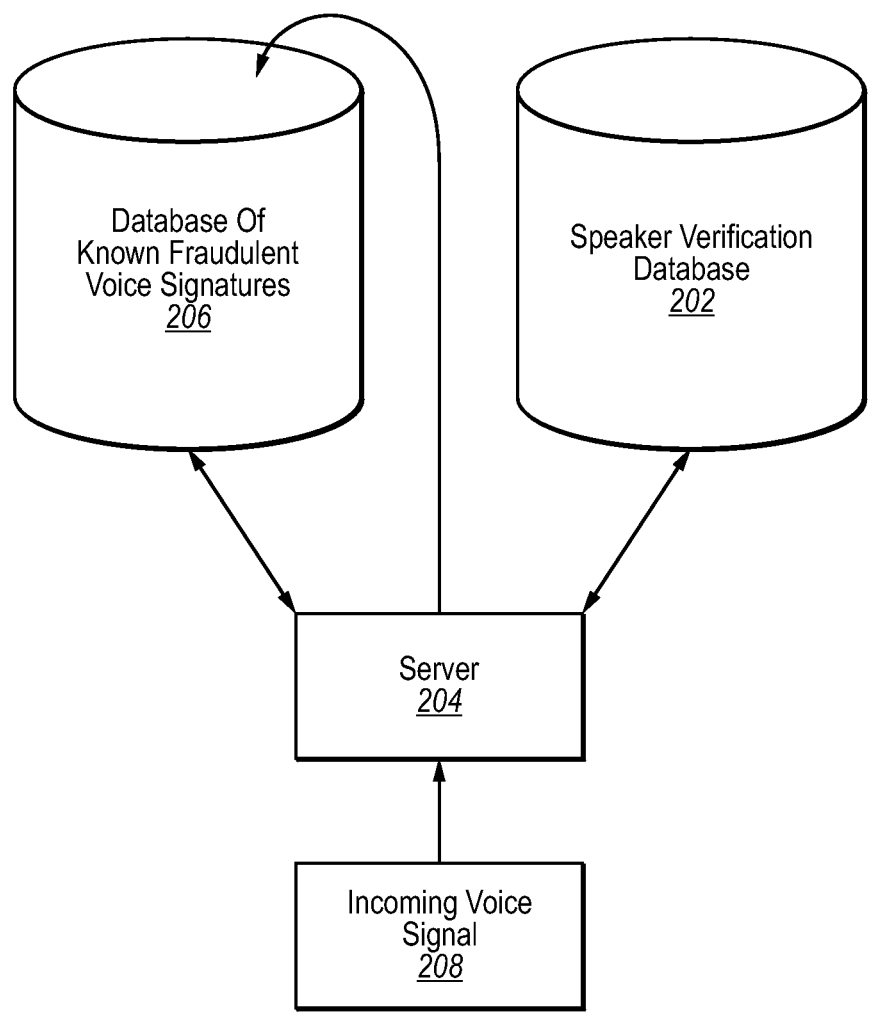
FIG. 2 illustrates an exemplary system for detecting fraudulent transactions using voice data to continually update a database of known fraudulent voice signatures.

The present invention relates to detecting fraudulent transactions using voice data to continually update a database of known fraudulent voice signatures. One preferred example and application in which the present invention may be applied is securing credit card transactions on the Internet. FIG. 2 illustrates a basic example of an implementation of the method. Credit card users would be solicited for a voice pattern to add to the speaker verification database (202) prior to transactions in order to populate the speaker verification database. The speaker verification database might associate the voice pattern to the credit card number for easy lookup. When transactions are initiated, the user sends a voice signal (208) to the server (204). As an example this voice signal could be sent via VoIP from a web browser, a phone call to a server or call center, a phone call from the server, or any other method of transmitting and receiving a voice signal. The server compares the received voice signal (208) to the database of known fraudulent voice signatures (206). If the voice signal is a substantial match to the database of known fraudulent voice signatures (206), the transaction is denied. If, on the other hand, there is a less than substantial match or no match at all, the voice signal (208) is compared to the speaker verification database (202). If the voice signal does not substantially match the speaker verification database, then the server may solicit additional information, for example, by asking "What is your mother's maiden name?" or "Please enter your pin number." If the received information is not verified, the transaction is rejected and the user's voice signal is added to the database of known fraudulent voice signatures (206). In this way the database of known fraudulent voice signatures (206) is updated.

Figure 3:
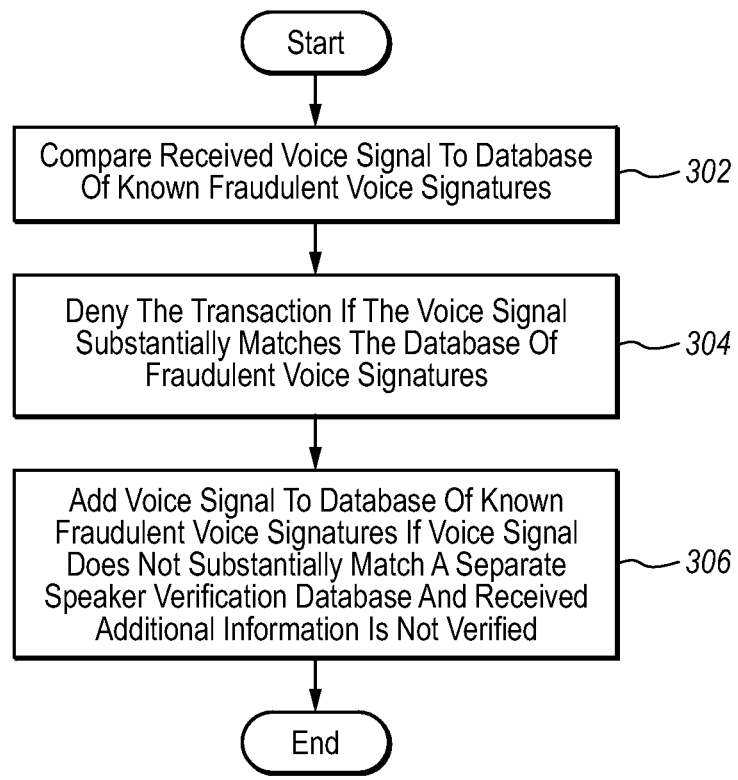
FIG. 3 illustrates a method embodiment of the invention.

This exemplary method embodiment of the invention is shown in FIG. 3. The method comprises comparing a received voice signal against a database of known fraudulent voice signatures (302), denying the caller's transaction if the voice signal substantially matches the database of known fraudulent voice signatures (304), and adding the caller's voice signal to the database of known fraudulent voice signatures if the voice signal does not substantially match a separate speaker verification database and received additional information is not verified (306).

One exemplary variation is where the system solicits a specific word or phrase to apply to both the database of known fraudulent voice signatures and the speaker verification database. For example, the system could prompt the caller: "Please state your name." The resulting voice signal could be used to search both databases. This variation has the advantage of shorter speaking time for the caller and simultaneous lookup in both databases for faster overall processing time.

Another exemplary variation is where the system solicits a different word or phrase to apply to both databases. For example, the system could prompt the caller "Please say the phrase 'I am not a crook'" to check the received voice signal for a substantial match in the database of known fraudulent voice signatures. Then the system could prompt the caller "Please say the word 'prestidigitation'" or any other unusual or uncommonly spoken word and check the resulting voice signal for a match in the speaker verification database. This approach has the advantage of allowing different voice signals to compare to each database. If needed, each phrase could supply additional material for comparison to the databases. In this way, each database comparison may be tailored to accommodate the received voice signals. In this regard, words may be used to tailor the test based on which database is being queried. For example, if particular word patterns are used by fraudulent people, then the first prompt may employ such word patterns for the verification against the fraudulent voice database. The system may prompt the user to say: "I forgot my password" or some other phrase commonly or likely used by a fraudulent user. If particular word patterns are used by nonfraudulent people, then the second prompt may request word patterns like "My name is . . . " to compare to the speaker verification database.

Another exemplary variation is where the system solicits a word or phrase to apply to the databases of known fraudulent voice signatures and some piece of personal information to apply to the speaker verification database. For example, the system could prompt the caller "Please say the phrase 'I am not a crook'" to check the received voice signal for a substantial match in the database of known fraudulent voice signatures. Then the system could prompt the caller "Please say your PIN number," "Please state your name," or "please say your mother's maiden name" and check the resulting voice signal against the speaker verification database. This approach has the advantage of allowing custom, personal voice signals to compare to the speaker verification database. Voice signals containing personal information may have additional inflections or nuances to them which can aid in identifying fraudulent voice signals.

Yet another variation, upon passing the first comparison to the database of known fraudulent voice signatures and not passing the second comparison to the speaker verification database, would transfer the call to an actual person who could solicit additional personal information, such as PIN number, billing address, or Card Security Code (such as the 3 digit code on the back of a Visa or Mastercard or the 4 digit code on the front of an American Express card) to verify that the caller's identity and authorize the transaction.

One advantage over solutions known in the art is that a continually updated database of known fraudulent voice signatures prevents known imposters from stealing more cards. Once a "bad" voice signature is in the database that unauthorized voice cannot be used in future credit card transactions. Currently known or future discovered methods may be employed to correct and remove erroneous fraudulent voices from the fraudulent voice database. A dynamically updated database of known fraudulent voice signatures creates an additional layer of security and deterrence against repeat would-be offenders.

A caller's voice signal preferably substantially matches the database of known fraudulent voice signatures (206). The concept of a substantial match is a dynamic one which should not be strictly interpreted as a rigid percentage or threshold. As an example, if a voice signature is common and similar to many others, a higher certainty may be necessary to establish a substantial match, whereas a unique or uncommon voice signature may require a lower certainty to establish a substantial match. Another example is the relationship between the database of known fraudulent voice signatures and the speaker verification database (202). If the voice print has a medium or high certainty match in the database of fraudulent voice signatures, then the threshold of certainty could be raised when comparing to the speaker verification database, whereas if the voice print has a very low certainty match in the database of fraudulent voice signatures, then the threshold of certainty when comparing to the speaker verification database could be lowered. Finding a substantial match can mean a dynamic, sliding scale of certainty based on factors that may include the type of voice and the level of certainty of the match in the fraudulent voice signatures database (206) or speaker verification database (202).

Embodiments within the scope of the present invention may also include tangible computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, fraud tracking based on voiceprint could be applied to paypal transactions, myspace.com and other social networking websites, child protection services, or restricting convicted felons from purchasing firearms. Accordingly, the appended claims and their legal equivalents should only define the invention, rather than any specific examples given.

We claim:

1. A method comprising:
    comparing a first voice signal associated with a user against a database of known fraudulent voice signatures, wherein the first voice signal corresponds to word patterns used previously by people engaged in fraud securing a transaction of a credit card;
    identifying the first voice signal as fraudulent when the first voice signal substantially matches an entry in the database of known fraudulent voice signatures;
    comparing a second voice signal against a speaker verification database of voice signals associated with the credit card when the first voice signal is not identified as fraudulent, wherein the second voice signal comprises an uncommonly spoken word;
    requesting a third voice signal containing personal information for the user associated with the first voice signal and associated with the credit card when the first voice signal does not substantially match an entry in the speaker verification database for the user; and
    adding the first voice signal to the database of known fraudulent voice signatures when the personal information cannot be verified.

2. The method of claim 1, further comprising:
    employing a sliding threshold scale of confidence in query results obtained from the speaker verification database based on a confidence level of query results obtained from the database of known fraudulent voice signatures.

3. The method of claim 2, wherein the personal information for the user associated with the first voice signal and associated with the credit card comprises a personal identification number and a card security code.

4. The method of claim 1, further comprising:
    performing a transaction when the first voice signal substantially matches the speaker verification database and the personal information is verified.

5. The method of claim 1, further comprising:
    denying further user action when the personal information is not verified.

6. The method of claim 1, wherein the personal information for the user associated with the first voice signal and associated with the credit card comprises one of a personal identification number, a billing address, and a card security code.

7. A system comprising:
    a processor; and
    a computer-readable storage medium having instructions stored which, when executed by the processor, cause the processor to perform operations comprising:

comparing a first voice signal associated with a user against a database of known fraudulent voice signatures, wherein the first voice signal corresponds to word patterns used previously by people engaged in fraud securing a transaction of a credit card;

identifying the first voice signal as fraudulent when the first voice signal substantially matches an entry in the database of known fraudulent voice signatures;

comparing a second voice signal against a speaker verification database of voice signals associated with the credit card when the first voice signal is not identified as fraudulent, wherein the second voice signal comprises an uncommonly spoken word;

requesting a third voice signal containing personal information for the user associated with the first voice signal and associated with the credit card when the first voice signal does not substantially match an entry in the speaker verification database for the user; and adding the first voice signal to the database of known fraudulent voice signatures when the personal information cannot be verified.

8. The system of claim 7, the computer-readable storage medium having additional instructions stored which result in the operations further comprising:

performing a transaction when the first voice signal substantially matches the speaker verification database and the personal information is verified.

9. The system of claim 7, the computer-readable storage medium having additional instructions stored which result in the operations further comprising:

denying further user action when the personal information is not verified.

10. The system of claim 7, the computer-readable storage medium having additional instructions stored which result in the operations further comprising:

employing a sliding threshold scale of confidence in query results obtained from the speaker verification database based on a confidence level of query results obtained from the database of known fraudulent voice signatures.

11. A computer-readable storage device having instructions stored which, when executed by a computing device, cause the computing device to perform operations comprising:

comparing a first voice signal associated with a user against a database of known fraudulent voice signatures, wherein the first voice signal corresponds to word patterns used previously by people engaged in fraud securing a transaction of a credit card;

identifying the first voice signal as fraudulent when the first voice signal substantially matches an entry in the database of known fraudulent voice signatures;

comparing a second voice signal against a speaker verification database of voice signals associated with the credit card when the first voice signal is not identified as fraudulent, wherein the second voice signal comprises an uncommonly spoken word;

requesting a third voice signal containing personal information for the user associated with the first voice signal and associated with the credit card when the first voice signal does not substantially match an entry in the speaker verification database for the user; and adding the first voice signal to the database of known fraudulent voice signatures when the personal information cannot be verified.

12. The computer readable storage device of claim 11, the computer-readable storage device having additional instructions stored which result in the operations further comprising:

performing a transaction when the voice signal substantially matches the speaker verification database and the personal information is verified.

13. The computer readable storage device of claim 11, the computer-readable storage device having additional instructions stored which result in the operations further comprising:

denying further user action when the personal information is not verified.

14. The computer readable storage device of claim 11, the computer-readable storage device having additional instructions stored which result in the operations further comprising:

employing a sliding threshold scale of confidence in query results obtained from the speaker verification database based on a confidence level of query results obtained from the database of known fraudulent voice signatures.

* * * * *